United States Patent [19]
Skurray

[11] 3,814,320
[45] June 4, 1974

[54] DE-ICING SPRAYING APPARATUS

[75] Inventor: Stephen J. Skurray, Basingtoke, England

[73] Assignee: Evers and Wall Limited, Newbury, Berkshire, England

[22] Filed: Oct. 26, 1972

[21] Appl. No.: 301,084

[30] Foreign Application Priority Data
June 30, 1972 Canada.............................. 146151

[52] U.S. Cl................. 239/127, 239/168, 239/169
[51] Int. Cl.............................................. B05b 1/20
[58] Field of Search........... 239/168, 169, 170, 163, 239/166, 127

[56] References Cited
UNITED STATES PATENTS
2,628,128  2/1953  Rhodeen............................ 239/168
3,231,198  1/1966  Ackley et al...................... 239/168
3,301,487  1/1967  Young................................ 239/168
3,670,963  6/1972  Stroebel et al.................. 239/168 X Primary Examiner—M. Henson Wood, Jr.
Assistant Examiner—John J. Love

[57] ABSTRACT

De-icing spraying apparatus constructed so as to provide one or two wing boom assemblies, each for projecting on a respective side of a spraying vehicle and having spaced-apart spray nozzles supported thereon to permit spraying of an airport runway. A centre spraying section is also provided and the wing boom sections are foldable along the sides of the vehicle when not in use to permit travel of the vehicle along a highway. Resilient support cables are provided between the centre section and each wing boom section.

10 Claims, 9 Drawing Figures

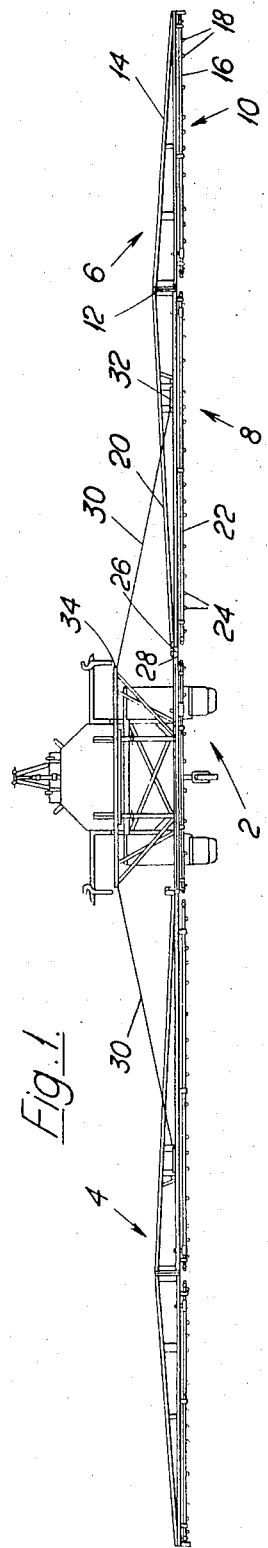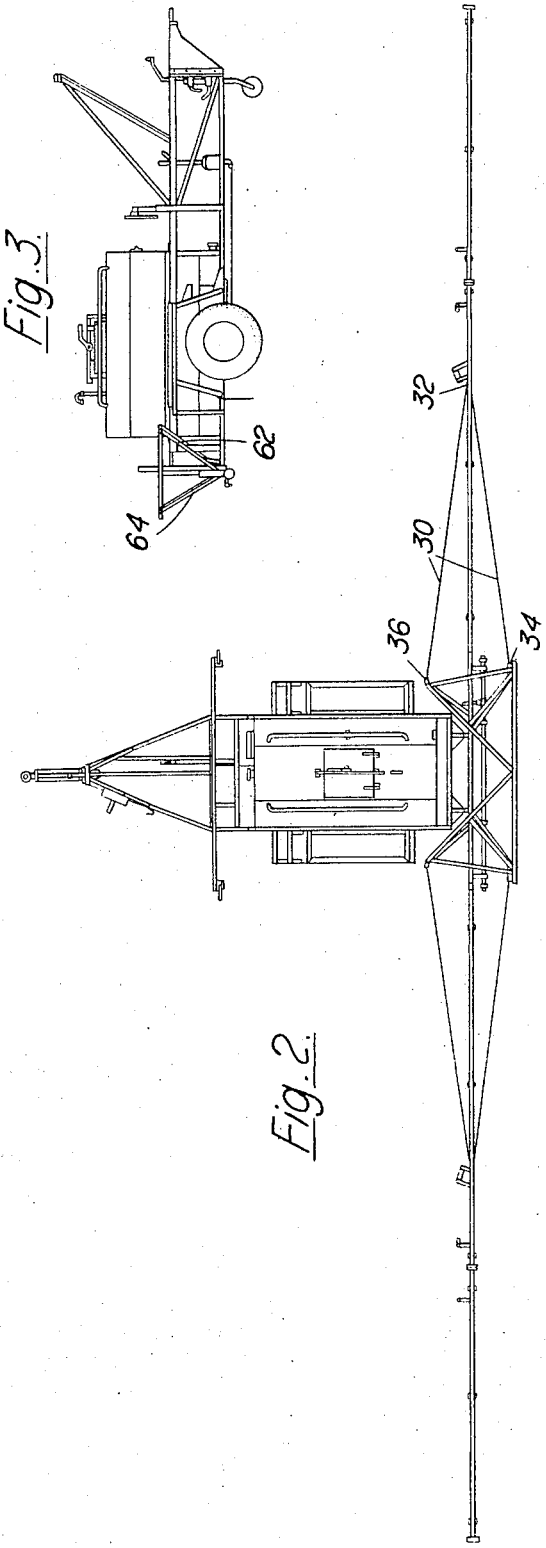

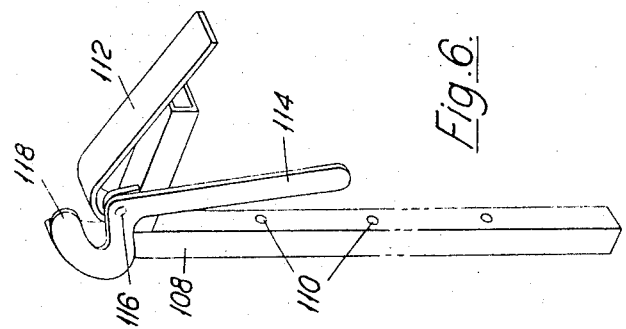
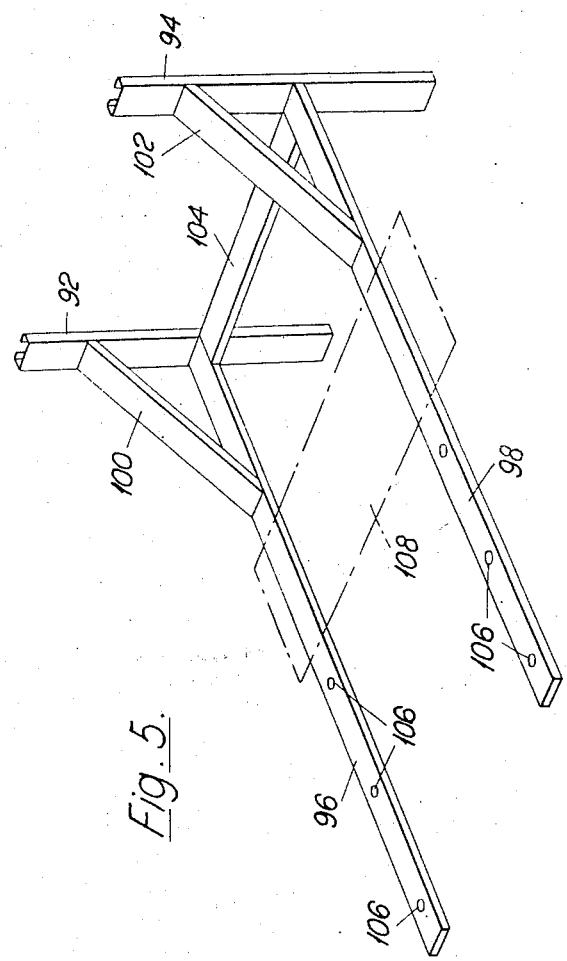

DE-ICING SPRAYING APPARATUS

This invention is concerned with spraying apparatus for spraying de-icing chemicals onto surfaces such as airport runway and taxiway surfaces.

As is well known, the removal of ice which is bonded to runway and taxiway surfaces has hitherto been a most difficult problem in the field of snow and ice clearance. Several men are often required to handle de-icing spraying machines which are presently in use and, whilst some development work has been carried out in this field, it would seem that most of the airport spraying machines are modifications of agricultural spraying machines or converted tanker trucks. As will be apparent, the problems met in spraying airport runways for de-icing are different to those experienced in spraying agricultural crops and I believe that such modified machines have many disadvantages which result in considerable difficulties in using such modified machines for the spraying of airport runways.

Difficulties may be experienced in that the chemicals used for de-icing are different to the chemicals used in agricultural spraying and special precautions have thus to be taken. Difficulties may also be experienced in using the particular type of boom designed for agricultural spraying which may well be too rigid and may require a relatively expensive hydraulic damping system to reduce the shock thereto during use, for example if it strikes the ground or an obstruction.

It is an object of the present invention to provide spraying apparatus which can be constructed so as to be particularly suitable for use in de-icing airport runways and which does not suffer, to the same extent, from the disadvantages referred to above in connection with the said modified agricultural machines.

It is also an object of the present invention to provide apparatus in which an improved flexible boom arrangement is provided for the spray nozzles.

It is also an object of the present invention to provide spraying apparatus for airport de-icing which is capable of construction so as to be readily handled by one man in cold weather conditions.

Accordingly, the present invention provides in de-icing spraying apparatus a spray nozzle support structure for supporting pipe having a plurality of spray nozzles spaced from each other along its length comprising a first centre spraying section and a wing boom spraying section, hinge means between said wing boom section and said first centre section to permit limited vertical or horizontal pivotal movement of said wing boom section in relation to said first centre section, said first centre section being symmetrically designed with reference to its vertical axis to provide two effective pivot axis on either side of its longitudinal axis, and resilient support means between said wing boom section and said first centre section to provide resilient support for said wing boom section during use of the spraying apparatus to permit said limited vertical or horizontal pivotal movement.

Preferably there is provided in de-icing spraying apparatus a spray nozzle support structure comprising: a first section of pipe having a first plurality of spray nozzles spaced from each other along its length, a first support section for said first section of pipe symmetrically designed with reference to its vertical axis, a second section of pipe having a second plurality of spray nozzles spaced from each other along its length, a wing boom support section for said second section of pipe, hinge means between said wing boom support section and said first section to permit limited vertical and horizontal pivotal movement of said wing boom section in relation to said first section, and resilient support means between said wing boom section and said first support section to provide resilient support for said wing boom section during said limited vertical and horizontal pivotal movement.

It is also an object of the present invention according to one embodiment thereof to provide a boom arrangement in which the wing sections may be readily folded so as to be stowed in a storage position adjacent to the main body of the de-icing spraying apparatus, so as to facilitate relatively quick removal of the spraying apparatus from one location to another at which it is required.

It is also an object from one embodiment of the invention to provide de-icing spraying apparatus utilizing a hydraulic system incorporating diaphragm pumps and filtration means to permit convenient transfer of de-icing chemical from a storage tank to spray nozzles provided along the boom, and also to facilitate transfer of de-icing chemical from a main storage tank to the storage tank of a vehicle carrying the spraying apparatus as well as to facilitate emptying the de-icing chemical from the storage tank on said vehicle if this should be desired.

Embodiments of the present invention will now be described, by way of example, with reference to the accompanying drawings in which:

FIG. 1 is a diagrammatic representation, from behind, of a spray boom mounted on a trailer for use on an airport runway;

FIG. 2 is a plan view of the spray boom and vehicle of FIG. 1;

FIG. 3 is a side view of the boom and trailer;

FIG. 5 is a representation of a removable boom support which may be provided with a boom assembly to facilitate attachment thereof to a standard vehicle in use in a particular location;

FIG. 6 is a representation of a retaining bracket for a wing boom when in a storage position on a vehicle;

Figure 4:
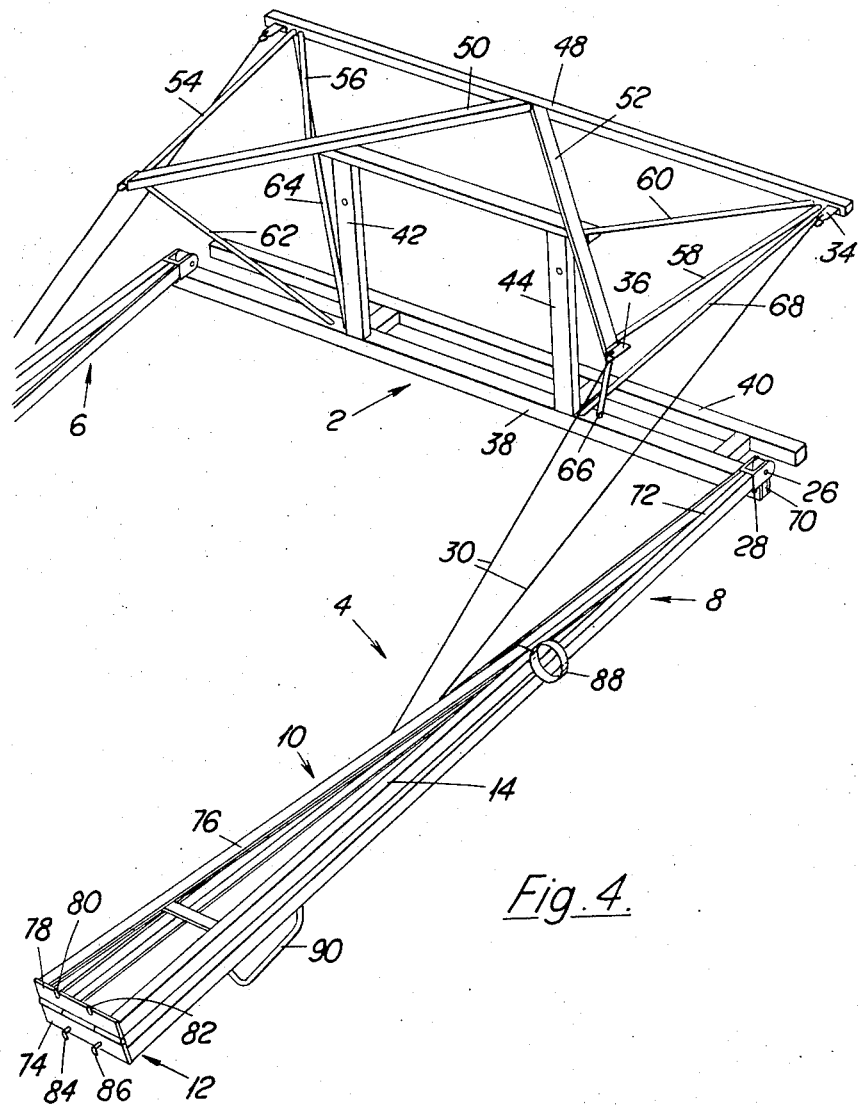
FIG. 4 illustrates the boom assembly so as to show the construction thereof but without the spray nozzles and associated delivery pipes.

Referring to FIG. 1, the de-icing spraying apparatus includes a spray nozzle support structure comprising a central section 2 and a pair of wing boom sections 4 and 6. Each wing boom section itself comprises two elongate sections 8 and 10 with a vertical hinge portion 12 therebetween as shown in FIGS. 1 and 4.

Section 10 comprises a frame member 14 and supported therefrom a first length of pipe 16 provided with a plurality of downwardly-extending spray nozzles 18. The spray nozzles 18 are brass fan jets at 305 m.m. (12 inches) centres, capable of operating down to pressures of 0.5 kg/cm² (7.5 lbs/in.²) fitted with special anti-drip devices to avoid waste of the de-icing chemicals.

The section 8, similarly, comprises a support framework 20 of approximate triangular construction, and a second length of pipe 22 is supported therefrom with its respective spray nozzles 24. The framework 20 of section 8 is pivotally connected to a portion of section 12 by way of a vertical hinge pin arrangement 26 and a horizontal hinge pin arrangement 28, as can be seen more clearly in FIG. 4.

To provide the required support and flexibility, each wing boom section 4 and 6 is provided with support cables 30 having one end connected at 32 on the respective wing boom intermediate its ends and its other end connected at 34 and 36 to brackets on the upper parts of section 2 by a U-shaped swivel arrangement as shown in FIGS. 1, 2 and 4. The support cables 30 were manufactured after considerable design and experimentation and are believed to be particularly suitable for use with a de-icing spraying apparatus according to the present invention. Each cable comprises a centre of hemp around which steel cable strands are wound in a spiral fashion. It will be appreciated that other materials might well be suitable but it has been found in practice that the particular type of construction described gives the support and flexibility required as a wing boom bounces up and down during use on an airport runway. Thus it would seem not to be necessary to provide a relatively expensive hydraulic damping system, shock absorbing system or spring-type unit since the self-damping features of the illustrated construction appear to be adequate when used with the over-centre hinging arrangement for the boom assembly as illustrated in the Figures. The stability and flexibility of the boom which is achieved greatly facilitates easy handling of the boom assembly in cold weather by a single operator.

As will be clear from the above description, the particular design of the boom assembly is especially important in the embodiment shown in FIGS. 1 through 4. Referring to FIG. 4, it will be seen that the centre section 2 comprises two hollow base frame members 38 and 40 of square cross-section spaced from each other with short intervening space members as shown in FIG. 4. Two substantially vertical members 42 and 44 support a substantially horizontal member 46, each of rectangular cross-section. Thereabove, a further rectangular beam frame member 48 is supported having shorter beam frame members 50 and 52 subtending at an angle from the centre of beam member 48. A substantially circular strut member 54 extends from approximately one free end of member 48 to the free end of member 50 whilst a second strut member 56, of circular cross-section, extends from said one free end to approximately the mid-point of member 50. Similarly, a strut member 58, of circular cross-section, extends from the other free end of member 48 to the free end of member 52 whilst a further strut member 60 extends from said other free end of member 48 to the mid-point of member 52.

The upstanding support struts 62 and 64 are provided from the frame member 38 to the free ends of members 50 and 48 respectively whilst upstanding support struts 66 and 68 are provided from member 38 to the free end of member 52 and the other free end of member 48.

It will be seen from FIGS. 1 through 4 that the centre portion 2 is symmetrically designed with the strut members 62 and 64, as well as the strut members 66 and 68 subtending equal angles to the vertical. This can be more clearly seen in FIG. 3 in which the projection of struts 62 and 64 and the member 50 are seen to form an isosceles triangle with the projection of struts 62 and 64 forming the equal sides thereof, at equal angles to the vertical plane bisecting the intermediate angle. In practice it has been found that the illustrated symmetrical arrangement is effective to provide a support for the wing booms whereby two hinge pivot lines therefor are provided, corresponding to the sides of the above-mentioned isosceles triangle provided by struts 62 and 64 and, on the other side of the central section by the struts 66 and 68.

At each end of the frame member 38 a double-acting hinge arrangement is provided for supporting the respective wing boom sections 4 and 6.

At one end of the beam frame member 38 a first short section member 70 is pivoted to the member 38 by the hinge pin 28 which, in use, occupies a substantially horizontal position. At the other end of the short section member 70, one end of a wing boom member 72 forming part of the wing boom section 4, is pivotally connected thereto by the hinge pin 26 which, in use, is designed to occupy a substantially vertical position.

As shown in FIG. 4, the boom frame member 72 is narrower at its end adjacent the hinge pin 26 but widens out, approximately three times, and is rigidly attached to the first plate portion 74 of the above-mentioned vertical hinge portion 12. A boom frame member 76, forming part of the section 10, is rigidly attached to the other plate 78 of the vertical hinge portion 12. The vertical hinge portion 12 is provided with two cut-out slots 80 and 82 and two corresponding locking pin members 84 and 86 to facilitate rigid locking of the two sections 8 and 10 together in an elongate position to form the respective wing boom section 4.

As shown in FIG. 4, the section 10 tapers from its end adjacent the hinge portion 12 towards its free end where an appropriate termination ring 88 is provided.

A substantially U-shaped bar member 90 is rigidly connected to the underside, in FIG. 4, of the frame member 72 to facilitate locking of the wing boom section in a stowage position on its respective vehicle, as shown in FIG. 3, by means of a boom retaining bracket as shown in FIG. 6.

From a careful consideration of FIG. 4, it will be seen that the wing boom section 4 is not constructed of solid plate members but may conveniently be of a skeleton-like construction from angle-iron members with appropriate bridging and strengthening members. In one embodiment, the wind boom sections were fabricated in mild steel to support the hydraulic jet gallery. In one constructed embodiment the width of the spray boom arrangement when mounted on the respective vehicle for transportation, approximately equal to the width of the central section 2, was 2.5 meters (8ft. 3 in.). In use, with the wing boom sections extended the width was 15.2 meters (50ft.) and the height from the ground was adjustable between 254 m.m. (10in.) and 630 m.m. (25in.). In another embodiment section 2 is 10 ft. wide and thus can be mounted behind fuel tankers and facilitate folding of the boom sections up the sides of the 8 ft. wide vehicles.

As can be seen from FIGS. 1 through 4, the wing boom section 6 is constructed in the same manner as the above-described wing boom section 4. The hinging of the wing frame sections, such as 8 and 10, permitted the easy folding forward of the sections to the stowage position. The boom wing sections were designed to hinge forwards, backwards or upwards on striking the ground or an obstruction. This flexibility was facilitated by the hinge arrangements described and the use of the specially-designed support cables 30.

It should also be mentioned that the height of section 2 in the above-described embodiment was 2 ft. 6 in. whilst the folded length of the wing boom section, shown in FIG. 4, from the centre of section 2 was 12 ft. 6 in.

The spray wing boom section may be mounted on its own vehicle or trailer, or alternatively the spray wing boom section can be provided separately with its own engine, pump and hydraulic fuel pipes so that it can be conveniently mounted on a vehicle already available to a user and normally used for other purposes. FIG. 5 illustrates a removable boom support slide rail adapted to support the spray wing boom sections and its associated engine, pumps and hydraulic fuel pipes. The boom support slide rail can then be conveniently mounted on a particular vehicle. Referring to FIG. 5 it will be seen that the boom support slide rail comprises two upright section members 92 and 94, 2ft. 10 in. in height, with two 6-ft.frame members 96 and 98 extending at right angles therefrom with respective strengthening members 100 and 102. As shown, a further separating and strengthening member 104 extends between the frame members 96 and 98. Each frame member 96 and 98 is provided with a plurality of apertures 106 to facilitate bolting of the boom support slide rail on the respective vehicle.

The boom support slide rail of FIG. 5 is designed to permit mounting thereon, at the location identified by the broken lines 108, of a platform carrying thereon the engine, diaphragm pumps and auxiliary equipment for supplying the wing boom sections with the desired chemical, but it will be appreciated that the main storage tank for the chemical will be mounted on the respective vehicle or some other location.

In use, the spray wing boom section is mounted on the vertical frame members 92 and 94, perhaps by rods slidable within the members 92 and 94. The boom support slide rail is then mounted on the vehicle and the fluid pipelines connected to the associated chemical storage tank so that spraying may proceed.

In FIG. 6, there is illustrated a retaining bracket for one of the wing boom sections 6 or 8 and adapted to clamp on the respective U-shaped member 90.

Referring to FIG. 5, the boom retaining bracket comprises an L-shaped member 108 of rectangular cross-section provided with a plurality of apertures 110 for mounting on the frame of a vehicle. A sloping thin spring-like portion 112 overlies the shorter leg of the L-shaped member as shown in FIG. 6, the overall width of the bracket then being 1 ft. 3 in. with a length of 3 ft. A locking arm 114 is pivoted at 116 so that when the wing boom section is swung into a stowage position then the member 90 (FIG. 4) rides up the surface of the spring-like portion 112 over the curved inner surface thereof to lie in its receiving socket. By then rotating the arm 114 in an anti-clockwise direction about its pivot pin 116, it is then possible to securely lock the member 90 within the receiving socket due to the curved formation of the end 118 of the arm 114. Thus the spraying apparatus can be readily transported with the spray wing booms in the stowage position.

Figure 7:
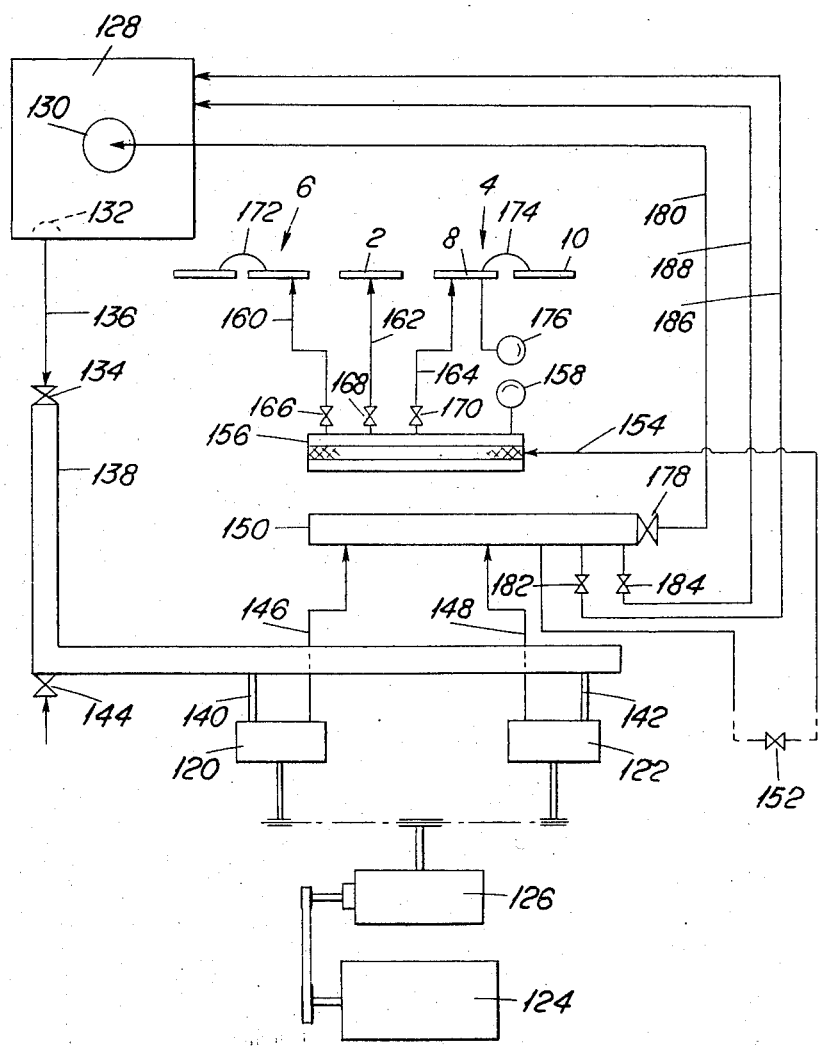
FIG. 7 is a diagrammatic representation of a hydraulic system for use according to one embodiment of the present invention.

As mentioned above, the hydraulic system for the illustrated embodiment of the invention was particularly designed having regard to the use for which is was required. In FIG. 7 there is illustrated a diagrammatic representation of a hydraulic system for use according to one embodiment of the present invention. Referring thereto is will be seen that two diaphragm pumps 120 and 122 are driven from an engine 124 through an appropriate worm gearbox 126 and associated drive connections, which may conveniently be chain drives.

The engine 124 may be a Briggs and Stratton 14 H.P. or a Kohler 12 H.P. air-cooled 4 stroke petrol engine c/w dynamo and self-starter or a Petter BAI diesel engine c/w starter and dynamo. A Briggs and Stratton 7 H.P. air-cooled 4 stroke petrol engine of 275 c.c. has also been used. A centrifugal clutch for easy starting may be used and V-belts between engine 124 and gearbox 126. it will be understood that any suitable type of clutch may be used, for example an electro-magnetically operated clutch which could conveniently be operated from the cab of a towing vehicle. It could also be used to control the flow of chemical as well as, or instead of, a separate solenoid valve (referred to below with reference to FIG. 8).

The pumps 120 and 124 may be Evers and Wall Multi-diaphragm pumps giving 40 or 60 G.P.M. and pressures up to 150 PSI (180 L/M or 270 L/M at up to 10 Kg cm$^2$).

The de-icing spray chemical is fed to the pumps 120 and 122 from a storage tank identified as 128 in FIG. 7. The tank 128 is provided with an 18 inch manhole 130 with a 40 mesh locked nylon tank lid filter (heat-sealed at the junctions). In the embodiment of FIG. 7 the tank was constructed as having a capacity of 2045 litres (450 gallons) whilst in the embodiment of FIG. 8 the tank was constructed as having a capacity of 5000 litres (1100 gallons) and the tank was internally coated against corrosion.

It was furthermore provided with a baffle arrangement 132 comprising a plurality of parallel baffle plates to provide an anti-swirl suction supply, i.e. to prevent rotational swirl at the point of suction and thus air being incorporated in the system.

The de-icing and anti-icing chemical used for the United States and Canada may be UCAR (a trade mark of Union Carbide) of 50 percent ethylene glycol and 50 percent urea, or a Monsanto chemical — SANTOMELT (a trade mark) or the Kaiser Company's chemical ISOLV (trade mark) of formamide and urea.

For other parts of the world it may well be convenient to use other de-icing chemicals such as KONSIN (trade mark for di-ethylene and tri-ethylene glycol) or IMSOL A (trade mark). As is known, KONSIN is a glycol-based water soluble de-icing fluid specially developed by the Heavy Organic Chemicals Division of Imperial Chemical Industries Limited to remove ice forms from runways quickly, cheaply and safely. IMSOL A is a distillate of isopropanol and water and, among other uses, may be used as a dilutant for "KONSIN." Normal handling of KONSIN presents no hazards so far as is known (it has a flash point well above 100°C) but IMSOL A is a highly flammable liquid.

In FIG. 7, by opening a valve 134, liquid is drawn from the tank 128 through fluid pipe lines 136 into a coated suction gallery 138. From there the de-icing fluid passes into pump 120 through a pipe line 140 and into pump 122 through pipe line 142. It is to be noted that the suction gallery 138 is provided with an additional valve 144 whereby self-filling of the storage tank 128 may be accomplished from an outside source and, alternatively, draining of the system can be accomplished through the valve 144.

De-icing chemical is pumped out of pump 120 along a fluid pipe line 146 and out of pump 122 through fluid pipe line 148 into a coated filter body or unit 150.

One feature of the described embodiments of the present invention is that the required pressure for the spraying apparatus can be pre-set in a building so as to be correct for the particular anti-icing or de-icing operation required. Subsequent control of the spraying apparatus can then be accomplished by providing a remote control valve 152 in the cab of the towing or driving vehicle. De-icing chemical is caused by the pumps 120 and 122 to flow through the hydraulic pipe line 154 and valve 152 into a 40 mesh filter element delivery unit 156. It is to be noted that a "pre-set" measuring gauge 158 is connected to the filter element 156 to permit the pre-setting of the respective controls so as to provide the correct pressure, indicated on gauge 158, whilst the spraying apparatus is still within a building so that the correct operating pressure will be obtained when the spraying apparatus is actually in operation on a runway.

De-icing chemical is supplied to the nozzles of the boom spraying apparatus by way of three fluid pipe lines 160, 162 and 164 by way of three respective boom isolator valves 166, 168 and 170. The fluid pipe line 160 supplies the wing boom section 6, the fluid pipe line 162 supplies the centre section 2 whilst the fluid pipe line 164 supplies the other wing boom section 4 comprising the sections 8 and 10. It is to be noted that the two sections of the wing booms, such as 8 and 10, are interconnected by respective fluid pipe lines 172 and 174, the respective main fluid pipe line 160 or 164 feeding into the inner section of the respective pair of sections in that wing boom section.

A boom reading pressure gauge 176 is connected to the section 8 so as to measure the pressure of the chemical supplied thereto during operation of the spraying apparatus.

To facilitate filling of the storage tank 128 with de-icing chemical from an outside main storage tank, a self-filling valve 178 on the filter element body 150 is connected in a fluid pipe line 180 from the filter body 150 into the storage tank 128 by way of its locked nylon tank lid filter associated with the manhole 130. It will thus be seen that it is thereby possible to refill the storage tank 120 from the external main storage tank and to ensure that the incoming chemical is properly filtered before it is placed in the storage tank 128 directly associated with, and perhaps forming part of, the de-icing spraying apparatus according to the described embodiment of the present invention. As is well known, some chemical storage tanks often contain foreign bodies or extraneous matter and I have discovered that such matter is detrimental to the operation of de-icing spraying apparatus and have thus incorporated the filtering devices referred to above.

Two diaphragm pressure control/relief valves 182 and 184 are provided on the filter element body 150 with associated de-icing fluid pipe lines 186 and 188 feeding into the base of the storage tank 128. By this means, excess fluid in the filtration, or other, parts of the spraying apparatus may return to the storage tank and be effective to produce agitation of the chemical therein.

In using the apparatus illustrated in FIG. 7, it is first necessary to fill the vehicle tank 128 with a chemical from an outside storage tank. The outside storage tank is thus connected through valve 144 whilst valve 134 is closed. De-icing chemical is then drawn through the coated section gallery 138, through pumps 120 and 122 and is then pumped through the pipe lines 146 and 148 into the filter element 150. With valve 178 open the chemical then flows along pipe line 180, through the locked nylon tank lid filter and into the storage tank 128.

When it is desired to use the spraying apparatus according to the present invention for the spraying of, for example, an airport runway, the apparatus may conveniently be pre-set by setting it up in an aircraft hanger, or other building, by one man in relative comfort. The wing boom sections 4 and 6 are brought down from storage position and set to the spraying position as in FIG. 1 extending on either side of the respective vehicle. It will be appreciated however, that it is not necessary to extend the wing boom sections 4 and 6 if space is limited or if it is desired to drive the vehicle to the respective runway with the wing boom sections in their storage position.

The valves 166, 168 and 170 are closed to prevent chemical flowing to these nozzles jets in the respective sections of the spraying apparatus, valves 144 and 178 are closed whilst valve 134 is open. Chemical thus flows to the pumps 120 and 122 and thence into the filtration system including the filter element 150 and the filter 156, with the cab control valve 152 open. Pressure then registers on the preset gauge 158 which will be, of course, considerable higher than the actual pressure during operation, as shown on gauge 176. However, by the use of suitable tables we have found that it is possible to adjust the various valves and controls so that gauge 158 indicates a "setting up" pressure which corresponds to the required pressure on gauge 176, for spraying a particular runway of a known length for a desired time. Such tables will be produced below with reference to the embodiment illustrated in FIG. 8.

Referring to FIG. 7, chemical flows along line 180 from the filter body 150 into the storage tank 128 by way of its locked nylon tank lid filter associated with the manhole 130. It will thus be seen that it is thereby possible to refill the storage tank 128 from the external main storage tank and to ensure the incoming chemical is properly filtered before it is placed in the storage tank 128 directly associated with, and perhaps forming part of, the de-icing spraying apparatus according to the described embodiment of the present invention. As is well known, some chemical storage tanks often contain foreign bodies or extraneous matter and I have discovered that such matter is detrimental to the operation of the de-icing spraying apparatus and have thus incorporated the filtering devices referred to above.

When the tank 128 is filled with chemical, then the spraying apparatus is ready for use and can be pre-set as mentioned above, in an aircraft hanger, or other building, to effect the desired de-icing or anti-icing operation by utilizing the remote cab control valve 152.

In one constructed embodiment using the arrangement of FIGS. 1 to 7 with a tank having a capacity of 2045 litres (450 gallons) internally coated against corrosion and constructed from fabricated structural hollow mild steel sections, it was found that one man could clear an airport runway of 67,000 square meters, (8000 square yards) of ice up to 6.5 m.m. (¼ inch thickness) in one hour.

With reference to the controls in FIG. 7, the spray controls, were mounted on the front of the apparatus and the isolating valves were fitted for the centre sections and each wing section of the spray boom. Separate ON/OFF control for mounting on a towing vehicle was provided together with the ability to self-fill storage tanks. The usual obstruction lights were fitted on the highest part and on the boom wings. The draw bar was adjustable for heights from ground level of 305 m.m. (12 inches), 355 m.m. (14 inches), 406 m.m. (16 inches), 863 m.m. (34 inches), 914 m.m. (36 inches), 965 m.m. (38 inches).

Figure 8:
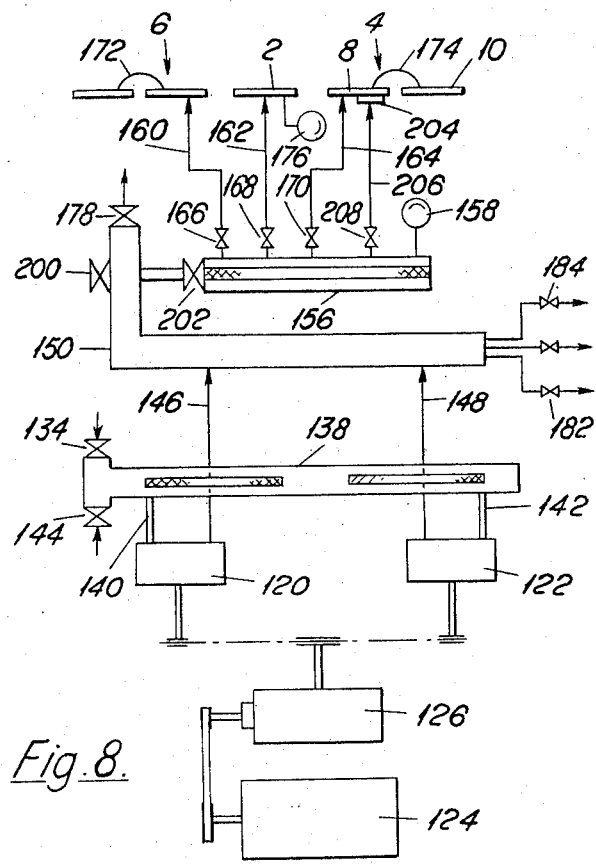
FIG. 8 is a diagrammatic representation of another hydraulic system for use according to a further embodiment of the present invention.

A further embodiment according to the present invention utilizes a 5000 litre (1100 gallons) capacity tank internally coated against corrosion with an 18 inch manhole near the rear of the tank, with access ladder. The spraying apparatus is capable of providing 60 gallons per minute and the opportunity has been taken to incorporate certain additional features which are shown in FIG. 8. In FIG. 8, the same reference numerals have been applied to parts which correspond to parts of the apparatus which are found in FIG. 7.

Referring to FIG. 8, the coated section gallery 138 is provided with a 20 mesh strainer element, the tank section valve 134 and the self-filling suction valve 144 for use with external above-ground storage. By means of this valve, it is possible to use the spraying apparatus pumps 120 and 122 to fill the storage tank 128 with chemical from the aboveground storage tank. By providing an additional valve 200 on the filter body 150 it is possible to utilize the pumps 120 and 122 so as to remove chemical from storage tank 128, through valve 134, and pass it along pipe lines connected to valve 200 to an outside storage tank. Valve 200 may also be utilized to facilitate pressure feeding of chemical to the tank 128, through its tank filter, from underground storage. It will be appreciated that the underground storage complex will include a pump to raise the chemical to ground level in the usual way.

It will be noted that the system of FIG. 8 provides a further diaphragm pressure control/relief valve additional to the valves 182 and 184 for the return of excess fluid to the base of the storage tank 128 for agitation purposes.

Instead of providing the remote cab control valve 152 of FIG. 7, the system of FIG. 8 provides an electric solenoid valve 202 with a switch located in the respective driver cab for remote control of all the boom isolator valves 166, etc.

In the system of FIG. 8 there is also provided an additional 6 foot spray boom assembly 204 which is adjustable in position to facilitate spot treatment of snow which builds up on and over the airport runway center lights, side lights, and traffic lights. This spray boom assembly 204 is supplied through a respective fluid pipe line 206 from a separate boom isolator valve 208. If it is desired to use the spray boom assembly 204 to clear the airport runway lights, etc., then the boom may be adjusted in position before leaving the airport hanger, the isolator valves 166, 168 170 are then kept closed and isolator valve 208 opened after pre-setting the necessary pressure. Then the spray boom assembly is driven along the airport runway until the boom 204 is over each light, in turn, whereupon the solenoid valve 202 is actuated to cause a short burst of chemical over the respective light.

The boom pipe 204 may conveniently be fitted with eight jets at 205 m.m. centres to give a 2 meter spray width, mounted on the leading edge of the near side inner wing boom, close to the universal joint hinge. This boom pipe 204 is fed from the right boom isolator valve 208 for spraying a band or spot treatment over the center lighting system on runways. The unit will be controlled remotely from the solenoid valve in the cab of the towing vehicle.

The boom assembly 204 can be moved outward, for example it may be clipped on, to give greater reach and span snow swept to the runway edge. This boom can then be used to give spot treatment of the runway side lights, and a swathe in front of the horizontal banks of green and red traffic lights at the head of the runway, for the control of snow thereon.

It will be appreciated that when normal spraying is proceeding along the runway, the isolator valve 208 may be kept closed.

Figure 9:
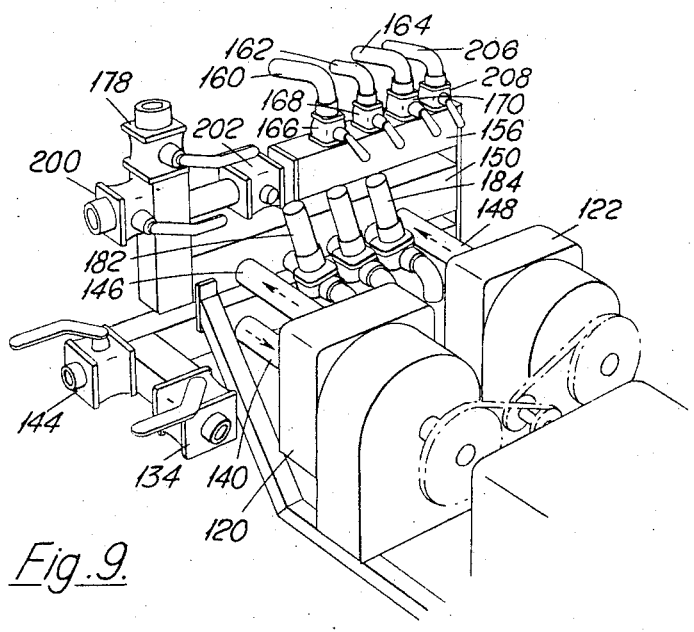
FIG. 9 is a perspective representation of the diaphragm pumps and associated apparatus corresponding to FIG. 8.

In FIG. 9, there is diagrammatically illustrated a practical construction of a part of the system schematically illustrated in FIG. 8. The same references numerals have been applied to like parts in FIG. 9 as have been used in FIG. 8 and it is believed that the construction and operation of the apparatus will be clear from a consideration of FIGS. 8 and 9.

In one constructed arrangement according to the embodiment shown in FIGS. 8 and 9, a 5000 litre trailer de-icer and anti-icer sprayer system was constructed with a spray width of 15 metres. Sixty spray jets were provided at 250 millimetre centres. As will be appreciated, the apparatus could provide a 10 metre spray width with the outer wings folded to facilitate operation in relation to the airport apron and also for high concentration applications. Conveniently 50 spray jets could be provided at 12 inch centres if desired.

In the constructed arrangement the height of the spray boom was adjustable between 260 millimetres (10 inches) and 640 millimetres (25 inches) from the ground. The wing sections were hinged and could easily be folded forward to the stowage position and the boom wings were designed to hinge forwards, backwards or upwards on striking the ground or an obstruction. The folded width was 2.5 metres (8 ft. 3 in.).

The spray nozzles used were wide-angle fan nozzles at 250 millimetre centres, capable of operating down to pressures of 0.5 Kg/cm$^2$ (7.5 lb/in$^2$). As will be appreciated the fitting of special anti-drip devices to avoid waste of most types of chemicals could readily be accomplished.

In the constructed arrangement the spray controls were mounted on the front face of the trailer. The four main isolating valves were fitted for the centre section, each wing section of the spray boom and the landing light boom. Separate remote control of the ON/OFF valve was provided for mounting on the towing vehicle. The apparatus had the ability to self-fill from chemical storage tanks above ground and a 40 mesh Nylon locked-mesh cloth filter was provided in the 18 inch tank lid. Generous size twin element 20 mesh suction filter arrangements were provided on the suction feed to the pumps whilst a 40 mesh delivery filter was provided for all the fluid before passing to the boom. Three diaphragm pressure control/relief valves were provided.

For pressure reading one 160 PSI, 4 inch pressure gauge was provided after final filtration for pre-setting of the pressure before leaving the airport hanger. One 100 PSI, 4 inch remote reading pressure gauge was provided to give accurate boom gallery pressure whatever the viscosity of the fluid being used. Obstruction lights were fitted at the highest point and on the maximum width of the vehicle, with the wing booms in semi-folded position and also on the wing tips.

It was found in the constructed arrangement that the output was a. A range of 0.01 L/M² (.2947 FL/OZ/SQ/YD) up to 0.10 L/M² (2.947 FL/OZ/SQ/YD) or (2.452 US GALS/1000FT²) with 60 GPM pumps.

b. As above but only up to 0.07 L/M² (2.0 FL/OZ/SQ/YD) with 40 GPM pumps.

c. A range of 0.015 L/M² (.442 FL/OZ/SQ/YD) up to 0.10 L/M can be applied with one size of jet, by alteration of speed and pressure only.

d. A speed range of 5 – 30 KPH (3.1 – 18.6 M.P.H.).

One particular advantage of the constructed arrangement was found in that the shipping space was kept to a reasonable requirement with an uncrated length of 18 ft. 6 in., a width of 8 ft. 6 in. and a height of 8 ft. 6 in.

The self-filling suction valve was fitted with a quick coupler, delivering fluid from an outside source into the tank lid through a 1 ½ in. ball valve and the 40 mesh tank lid filter, using the spare pumps to transfer liquid from ground level storage.

As mentioned above, apparatus according to the present invention can readily be pre-set in an airport hanger before being taken onto the airport runway to perform the desired de-icing or anti-icing operation. To facilitate the pre-setting, the operator can be provided with a table or chart whereby he determines the pressure indicated on the pre-set gauge 158 which he must achieve by manipulating the respective controls so as to provide the correct boom pressure on the gauge 176 during operation of the apparatus. The correct pressure will, of course, be determined by the distance to be covered in feet with a full tank of chemical, the type of jets used and the vehicle speed. The required spraying time can be readily calculated. Table 1 below indicates the respective parameters for using one type of fluid identified by the trade mark UCAR and with a type of jet 4110-36 and a jet height from the ground of 12 inches. The various temperature ranges are indicated and it will be seen that the relevant figures are given for different conditions.

With a different chemical slightly different conditions of operation will, of course, be often required and in Table 2 the parameters are given when using the chemical "Santomelt/Isolv".

Table 1

PERFORMANCE TABLE EVRALL (TRADE MARK) LIQUID SPREADER

450 IMP GALLON, OR 540 U S GALLON CAPACITY
Fitted with 2 Off D3 Pumps = 30 GPM

Fluid: UCAR  
Jet Fitted: 4110-36  
Jet Height from Ground: 12"

Temperature Range  
Ambient: 32° to −25°F.  
Chemical: 32° to 5°F.  
Ground: 32° to −5°F.

| Output US Gal/ 1000 Ft² | Output Imp Gal/ 1000 Ft² | Vehicle Speed MPH | Individual Jet Output GPM | Boom Gauge (176) psi | Pre-Set Gauge (158) psi | Distance Covered in Ft. for Tank Full, with Different Widths of Coverage | | | Spraying Time in Mins. |
|---|---|---|---|---|---|---|---|---|---|
| | | | | | | at 50' | at 100' | at 150' | |
| A .24 | .2 | 20 | .348 | | | 45000 | 22500 | 15000 | 25.85 |
| .24 | .2 | 25 | .436 | 12 | 57 | 45000 | 22500 | 15000 | 20.6 |
| A .36 | .3 | 20 | .523 | 17 | 106 | 30000 | 15000 | 10000 | 17.6 |
| B .48 | .4 | 15 | .523 | 17 | 106 | 22500 | 11250 | 7500 | 17.6 |
| C .72 | .6 | 10 | .523 | 17 | 106 | 15000 | 7750 | 5000 | 17.6 |
| C .96 | .8 | 7.5 | .523 | 17 | 106 | 11250 | 5625 | 3750 | 17.6 |
| D 1.2 | 1.0 | 6.0 | .523 | 17 | 106 | 9000 | 4500 | 3000 | 17.6 |
| D 1.4 | 1.2 | 5 | .523 | 17 10 15 | 106 | 7750 | 3875 | 2583 | 17.6 |

A = Anti-icing conditions  
B = Expectation of Freezing Rain  
C = De-icing 20°F to 32°F less ½" ice and glare ice  
D = De-icing 20°F and below, ¼" ice and glare ice.

The setting up and use of the spraying apparatus according to the present invention utilizing the above tables will be apparent. For example, if it is desired to use the chemical UCAR to spray a runway against an expectation of freezing rain then one uses Table 1. Assuming that the width of coverage is to be 100 feet then with a full tank one can spray 11250 feet of runway using the parameters set forth in the third row of Table 1. The pre-set guage 158 is set to record a pressure of 106 psi by adjusting the respective controls. The vehicle is then driven along the portion of the runway at 15 miles per hour and in 17.6 minutes the required distance of runway will have been sprayed against the expectation of freezing rain. The tank can then be refilled, the pre-set guage again checked and the spraying operation repeated so as to deal with a further section of runway having a length of 11250 feet.

If the fluid "Santomelt/Isolv" is used, then one merely refers to Table 2 for the required parameters, it being noted that different ice thicknesses are referred to in Table 2.

It will be appreciated that the use of diaphragm pumps in the described embodiments is particularly advantageous having regard to the conditions of use of the spraying apparatus and the possibility that the operator may permit a pump to run dry at the end of a run or on the way back for a refill of chemical. The design of the plumbing and spray system with its friction loss choice of pumps, use of centrifugal clutch, etc., is, of TABLE 2.—PERFORMANCE TABLE EVRALL (TRADEMARK) LIQUID SPREADER, 450 IMP. GALLON, OR 540 U.S. GALLON CAPACITY

[Fitted with 2 off D3 pumps=30 g.p.m.]

Fluid: Santomelt/Isolv
Jet fitted: 4110-30
Jet height from ground: 12″
Temperature range:
  Ambient: 32° F. to −15° F.
Chemical:
  32° F. to −10° F.
  32° F. to +5° F.
  32° F. to −15° F.
Ground: 32° F. to −15° F.

| | Ice thickness | Minimum run-way temperature | | Output, U.S. gal./1,000 ft.² | Output, imp. gal./1,000 ft.² | M.p.h. | Individual jet output, g.p.m. | Boom gauge, p.s.i. | Pre-set gauge, p.s.i. | Distance covered in ft. for tank full, with different widths of coverage at— | | | Spraying time in mins. |
|---|---|---|---|---|---|---|---|---|---|---|---|---|---|
| | | | | | | | | | | 50′ | 100′ | 160′ | |
| Anti-icing | Dry runway | −10° F | A | .24 | .2 | 20 | .348 | 12 | 38 | 45,000 | 22,500 | 15,000 | 26.85 |
| | Dry runway | −15° F | | .24 | .2 | 25 | .496 | 19 | 52 | 45,000 | 22,500 | 15,000 | 20.6 |
| | 1/32″ | +10° F | | | | | | | | | | | |
| | 1/16″ | +22° F | B | .36 | .3 | 20 | .523 | 28 | 92 | 30,000 | 15,000 | 10,000 | 17.6 |
| | 3/32″ | +27° F | | | | | | | | | | | |
| | 1/8″ | −5° F | | | | | | | | | | | |
| Anti-icing | 1/16″ | +15° F | C | .48 | .4 | 15 | .523 | 28 | 92 | 22,500 | 11,250 | 7,500 | 17.6 |
| Prevention of any ice formation, by treating runway with sufficient amount of chemical to prevent ice formation based on anticipated ice thickness build up and runway temperature. | 1/8″ | +22° F | | | | | | | | | | | |
| | 3/16″ | +26° F | | | | | | | | | | | |
| | 1/4″ | +4° F | | | | | | | | | | | |
| | 1/16″ | +17° F | D | .72 | .6 | 10 | .523 | 28 | 92 | 15,000 | 7,750 | 5,030 | 17.6 |
| | 3/16″ | +22° F | | | | | | | | | | | |
| | 1/4″ | −6° F | | | | | | | | | | | |
| | 1/16″ | +12° F | E | .96 | .8 | 7.5 | .523 | 28 | 92 | 11,250 | 5,625 | 3,750 | 17.6 |
| De-ice | 1/8″ | +19° F, air temp | | | | | | | | | | | |
| Anti-icing | 1/8″ | 0° F, air temp | | | | | | | | | | | |
| De-ice | 1/8″ | +15° F | F | 1.2 | 1.0 | 6.0 | .523 | 28 | 92 | 9,000 | 4,500 | 3,000 | 17.6 |
| | 1/4″ | −15° F, air temp | | | | | | | | | | | |
| Ice | 1″ | +20° F | | | | | | | | | | | |
| Anti-icing | 1/16″ | +2° F | G | 1.4 | 1.2 | 5 | .523 | 28 | 92 | 7,750 | 3,875 | 2,583 | 17.6 |
| De-ice | 1/8″ | +12° F, air temp | | | | | | | | | | | |
| | 3/16″ | 0° F, air temp | | | | | | | | | | | |
| Frozen packed snow | 1/4″ | +15° F | | | | | | 10 | 33 | | | | |
| | | | | | | | | 15 | 43 | | | | |
| | | | | | | | | 20 | 52 | | | | |
| | | | | | | | | 25 | 72 | | | | |
| | | | | | | | | 30 | 93 | | | | |
| | | | | | | | | 32 | 122 | | | | | course, determined by the viscosity, density, and surface tension of the chemicals which are being used. Specific checmicals have been referred to above. However, it will be appreciated that other makes of chemicals may be used, for example that sold by Allied Chemical Coporation under the Trade Name ARD/45, B.A. S. F. under the Trade Name L.K. 2019 or Du Pont's formanide (Trade Name) chemical.

Although different embodiments of the present invention have been described in detail, it should be understood that the present disclosure has been for example only and that many modifications and variations of the present invention are possible in the light of the above teachings, — for example only one wing boom section may be provided if a second one is not required for a specific operation. It is, therefore, to be understood that within the scope of the appended claims, the invention may be practised otherwise than as specifically described.

I claim:

1. In de-icing spraying apparatus a spray nozzle support structure comprising:
   a. a first section of pipe having a first plurality of spray nozzles spaced from each other along its length,
   b. a first support section for said first section of pipe symmetrically designed with reference to its vertical axis,
   c. a second section of pipe having a second plurality of spray nozzles spaced from each other along its length,
   d. a wing boom support section for said second section of pipe,
   e. hinge means between said wing boom support section and said first support section to permit limited vertical and horizontal pivotal movement of said wing boom section in relation to said first section,
   f. resilient support means to provide resilient support for said wing boom section during said limited vertical and horizontal pivotal movement and including a first and a second flexible support cable each having a first end attached to said wing boom support section, a second end of the first cable being connected to an upper portion of the first support section on one side of said longitudinal axis and a second end of said second cable being connected to an upper portion of the first support section on the opposite side of said longitudinal axis,
   g. said wing boom support section comprising a first elongate boom section and a second elongate boom section with a hinge portion therebetween, said second section of pipe being in two parts with a first part supported, in use, by the first elongate boom section and a second of said two parts supported, in use, by the second elongate boom section with said first and second elongate boom sections colinear, a flexible length of pipe interconnecting said two parts, said hinge portion permitting said second elongate boom section to be folded to a position in which it is substantially parallel to the first elongate boom section when not in said colinear use position, said hinge means permitting the wing boom section to be then folded to a storage position substantially at right angles to said co-linear use position,
   h. wherein the pipes of said structure are connected to receive spraying chemical from a hydraulic system including filter means for said chemical and including two diaphragm pumps to supply chemical to said filter means,
   i. a coated suction gallery unit for supplying chemical to said two diaphragm pumps and said filter means including a coated filter unit and a filter element delivery unit connected to the output of said coated filter unit,
   j. said first section of pipe being connected through a first hydraulic control valve to a first output of said filter element delivery unit, said first part of said second section of pipe being connected through a second hydraulic control valve to a second output of said filter element delivery unit, said filter element delivery unit being connected to the output of said coated filter unit through a remote control valve unit to facilitate pre-setting of the apparatus and remote control, in use, from the cab of an operating vehicle, and
   k. wherein said coated suction gallery unit is provided with a tank suction valve and a self-filling suction valve to facilitate filling of a chemical storage tank on a vehicle associated with the spraying apparatus from a main storage tank external to the vehicle.

2. A spray nozzle support apparatus according to claim 1 wherein said coated filter unit is provided with a self-filling valve with an outlet fluid pipe to supply the chemical to said chemical storage tank through a locked nylon tank filter thereof, said coated filter unit being also provided with an additional valve to facilitate return of chemical from said chemical storage tank to said main storage tank, if desired, under control of said diaphragm pumps.

3. A spray nozzle support structure according to claim 1 wherein said wing boom section is mounted on a support slide rail structure for removably mounting on a vehicle.

4. A spray nozzle support structure according to claim 1 wherein said remote control valve unit is a hydraulic unit located in said cab of the vehicle with associated connecting fluid pipe lines.

5. A spray nozzle support structure according to claim 1 wherein said remote control valve unit is an electrical solenoid valve unit with a control switch located in said cab of the vehicle and wires interconnecting said control switch and the electrical solenoid valve unit.

6. A spray nozzle structure according to claim 1 including a pre-set pressure guage connected to said filter element delivery unit.

7. A spray nozzle support structure according to claim 1 wherein at least one additional output is provided on said coated filter delivery unit and is connected through a diaphragm pressure control/relief valve to the base of a chemical storage tank of the spraying apparatus to cause agitation of the chemical therein during use.

8. A spray nozzle support structure according to claim 1 wherein said coated suction gallery unit includes a 20 mesh strainer element.

9. A spray nozzle support structure according to claim 1 wherein a further similar wing boom support section and associated section of pipe is provided on the opposite side of said first support section to said first-mentioned wing boom support section, said centre section being constructed of a plurality of frame members and presenting an inverted isosceles triangle in end view.

10. In de-icing spraying apparatus a spray nozzle support structure comprising:
   a. a first section of pipe having a first plurality of spray nozzles spaced from each other along its length,
   b. a first support section for said first section of pipe symmetrically designed with reference to its vertical axis,
   c. a second section of pipe having a second plurality of spray nozzles spaced from each other along its length,
   d. a wing boom support section for said second section of pipe,
   e. hinge means between said wing boom support section and said first support section to permit limited vertical and horizontal pivotal movement of said wing boom section in relation to said first section,
   f. resilient support means to provide resilient support for said wing boom section during said limited vertical and horizontal pivotal movement and including
      a first and a second flexible support cable each having a first end attached to said wing boom support section, a second end of the first cable being connected to an upper portion of the first support section on one side of said longitudinal axis and a second end of said second cable being connected to an upper portion of the first support section on the opposite side of said longitudinal axis,
   g. said wing boom support section comprising a first elongate boom section and a second elongate boom section with a hinge portion therebetween, said second section of pipe being in two parts with a first part supported, in use, by the first elongate boom section and a second of said two parts supported, in use, by the second elongate boom section with said first and second elongate boom sections co-linear, a flexible length of pipe interconnecting said two parts, said hinge portion permitting said second elongate boom section to be folded to a position in which it is substantially parallel to the first elongate boom section when not in said co-linear use position, said hinge means permitting the wing boom section to be then folded to a storage position substantially at right angles to said co-linear use position,
   h. wherein the pipes of said structure are connected to receive spraying chemical from a hydraulic system including filter means for said chemical and including diaphragm pumps to supply chemical to said filter means, said filter means including a coated filter unit and a filter element delivery unit connected to the output of said coated filter unit,
   i. said first section of pipe being connected through a first hydraulic control valve to a first output of said filter element delivery unit, said first part of said second section of pipe being connected through a second hydraulic control valve to a second output of said filter element delivery unit, said filter element delivery unit being connected to the output of said coated filter unit through a remote control valve unit to facilitate pre-setting of the apparatus and remote control, in use, from the cab of an operating vehicle, and
   j. including an additional spray boom assembly mounted on said support structure and movable along the length so as to extend beyond the outer and of said wing boom section to facilitate spot treatment of selected areas beyond said outer end of said wing boom assembly.

* * * * *